United States Patent
Kim et al.

(10) Patent No.: US 12,265,778 B2
(45) Date of Patent: Apr. 1, 2025

(54) METHOD OF DETECTING DEFECTIVE LAYER OF SEMICONDUCTOR DEVICE AND COMPUTING SYSTEM FOR PERFORMING THE SAME

(71) Applicant: Samsung Electronics Co., Ltd., Suwon-si (KR)

(72) Inventors: Junghwan Kim, Hwaseong-si (KR); Insu Jang, Hwaseong-si (KR); Hyeonhwa Jang, Seoul (KR); Ghilgeun Oh, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 756 days.

(21) Appl. No.: 17/539,697

(22) Filed: Dec. 1, 2021

(65) Prior Publication Data

US 2022/0180040 A1    Jun. 9, 2022

(30) Foreign Application Priority Data

Dec. 8, 2020 (KR) .......................... 10 2020 0170749

(51) Int. Cl.
*G06F 30/398* (2020.01)
*G06F 30/392* (2020.01)
*G06F 30/394* (2020.01)
*G06F 119/02* (2020.01)

(52) U.S. Cl.
CPC .......... *G06F 30/398* (2020.01); *G06F 30/392* (2020.01); *G06F 30/394* (2020.01); *G06F 2119/02* (2020.01)

(58) Field of Classification Search
CPC .................................................. G06F 30/398
USPC ........................................................ 716/112
See application file for complete search history.

(56) References Cited

U.S. PATENT DOCUMENTS

| | | | |
|---|---|---|---|
| 7,295,304 B2 | 11/2007 | Yamaguchi et al. |
| 7,676,077 B2 | 3/2010 | Kulkarni et al. |
| 7,802,210 B2 | 9/2010 | Bae et al. |
| 7,975,245 B2 | 7/2011 | Florence et al. |

(Continued)

FOREIGN PATENT DOCUMENTS

| | | | |
|---|---|---|---|
| JP | 2003-282665 A | 10/2003 |
| JP | 2004-172515 A | 6/2004 |

(Continued)

OTHER PUBLICATIONS

Korean Office Action dated Jan. 3, 2025 issued in Korean Patent Application No. 10-2020-0170749.

*Primary Examiner* — Eric D Lee
(74) *Attorney, Agent, or Firm* — Harness, Dickey & Pierce, P.L.C.

(57) ABSTRACT

Provided is a method of detecting a defective layer. A method, performed by a computing system, of detecting a defective layer of a semiconductor device including a plurality of layers includes obtaining candidate defective layer information regarding a plurality of candidate defective layers and obtaining physical structure information regarding the candidate defective layers, dividing each of wires in the candidate defective layers into virtual micro areas based on the candidate defective layer information and based on the physical structure information, and identifying a defective layer from among the candidate defective layers according to a number of the virtual micro areas.

20 Claims, 17 Drawing Sheets

(56) References Cited

U.S. PATENT DOCUMENTS

| | | | |
|---|---|---|---|
| 8,111,898 B2 | 2/2012 | Pang | |
| 8,289,770 B2 | 10/2012 | Lee et al. | |
| 8,930,782 B2 | 1/2015 | Benware | |
| 9,703,658 B2 | 7/2017 | Schuermyer et al. | |
| 9,916,093 B2 | 3/2018 | Shim et al. | |
| 10,096,530 B1 | 10/2018 | Lam et al. | |
| 10,198,548 B2 * | 2/2019 | Sharma | G06F 30/398 |
| 10,312,164 B2 | 6/2019 | Leu | |
| 10,592,625 B1 | 3/2020 | Tang et al. | |
| 2004/0139407 A1 | 7/2004 | Mukai et al. | |
| 2012/0297264 A1 | 11/2012 | Benware | |

FOREIGN PATENT DOCUMENTS

| | | |
|---|---|---|
| KR | 10-0703982 B1 | 4/2007 |
| KR | 10-2018-0129057 A | 12/2018 |

\* cited by examiner

| | NUMBER |
|---|---|
| L1 | 2 |
| L2 | 3 |
| L3 | 2 |
| L4 | 1 |
| L5 | 1 |
| L6 | 1 |

| | NUMBER | NUMBER OF MICRO AREAS |
|---|---|---|
| L1 | 2 | 20 |
| L2 | 3 | 19 |
| L3 | 2 | 18 |
| L4 | 1 | 8 |
| L5 | 1 | 12 |
| L6 | 1 | 8 |

FIG. 5C

| | USAGE INFORMATION | DEFECT ANALYSIS INFORMATION | WEIGHT |
|---|---|---|---|
| L1 | $U_{L1}$ | $PFA_{L1}$ | $W_{L1}$ |
| L2 | $U_{L2}$ | $PFA_{L2}$ | $W_{L2}$ |
| L3 | $U_{L3}$ | $PFA_{L3}$ | $W_{L3}$ |
| L4 | $U_{L4}$ | $PFA_{L4}$ | $W_{L4}$ |
| L5 | $U_{L5}$ | $PFA_{L5}$ | $W_{L5}$ |
| L6 | $U_{L6}$ | $PFA_{L6}$ | $W_{L6}$ |

FIG. 6

| | DEFECT PARAMETER |
|---|---|
| L1 | $N_{L1}$ |
| L2 | $N_{L2}$ |
| L3 | $N_{L3}$ |
| L4 | $N_{L4}$ |
| L5 | $N_{L5}$ |
| L6 | $N_{L6}$ |

FIG. 8

|     | C1       | C2       | C3       |
|-----|----------|----------|----------|
| L1  | $N_{11}$ | $N_{12}$ | $N_{13}$ |
| L2  | $N_{21}$ | $N_{22}$ | $N_{23}$ |
| L3  | $N_{31}$ | $N_{32}$ | $N_{33}$ |
| L4  | $N_{41}$ | $N_{42}$ | $N_{43}$ |
| L5  | $N_{51}$ | $N_{52}$ | $N_{53}$ |
| L6  | $N_{61}$ | $N_{62}$ | $N_{63}$ |

METHOD OF DETECTING DEFECTIVE LAYER OF SEMICONDUCTOR DEVICE AND COMPUTING SYSTEM FOR PERFORMING THE SAME

CROSS-REFERENCE TO RELATED APPLICATION

This application is based on and claims priority under 35 U.S.C. § 119 to Korean Patent Application No. 10-2020-0170749, filed on Dec. 8, 2020, in the Korean Intellectual Property Office, the disclosure of which is incorporated by reference herein in its entirety.

BACKGROUND

Inventive concepts relates to a computing system, and more particularly, to a method of detecting a defective layer of a semiconductor device and/or a computing system for performing the same and/or a method of fabricating a semiconductor device.

A process for manufacturing/fabricating a semiconductor device includes a plurality of unit processes such as photolithography processes, deposition processes, chemical processes such as wet chemical processes, planarization process such as chemical mechanical planarization (CMP) process, etc. Defects may occur in each of the unit processes. Defects may occur due to various factors like defect density within wafers, layout patterns in design, and process characteristics which may deteriorate semiconductor manufacturing yield.

To improve yield, it is beneficial to detect and/or predict defect factors early. A physical defect analysis (PFA) performed for defect analysis may take a large turn-around time (TAT) to perform a failure diagnosis of a semiconductor device and to check die/chips with defects.

Alternatively or additionally, a net may be identified as a combination of a plurality of layers expected to be or prone to be defective through a layout aware analysis, but it may be difficult to accurately identify a defective layer.

SUMMARY

Inventive concepts provide a method of detecting a defective layer of a semiconductor device for more accurately specifying a defective layer by considering a failure diagnosis result, characteristics of layers, physical structure of wires, layer usages, and/or defect analysis information together. Alternatively or additionally, inventive concepts provide a computing system for executing the method.

According to some example embodiments of inventive concepts, there is provided a method of detecting a defective layer of a semiconductor device including a plurality of layers performed by a computing system, the method including obtaining candidate defective layer information regarding a plurality of candidate defective layers and obtaining physical structure information regarding the candidate defective layers, dividing each of wires in the candidate defective layers into virtual micro areas based on the candidate defective layer information and based on the physical structure information, and identifying a defective layer from among the candidate defective layers according to a number of the virtual micro areas.

According to some example embodiments of inventive concepts, there is provided a method, performed by a computing system, of detecting a defective layer of a semiconductor device including a plurality of chips, the method including obtaining defect analysis information regarding candidate defective layers included in each of the plurality of chips by performing failure analysis on each of the plurality of chips, calculating a defect parameter value of each candidate defective layer for each of the plurality of chips based on at least one of physical structure information, the defect analysis information, and usage information of the candidate defective layers, and identifying a defective layer of the semiconductor device based on the defect parameter value of each candidate defective layer for each of the plurality of chips.

According to some example embodiments of inventive concepts, there is provided a computing system. The computing system comprises a memory configured to store candidate defective layer information comprising (A) types of a plurality of candidate defective layers for defects, (B) a number of the plurality of candidate defective layers for detects, (C) physical structure information regarding the candidate defective layers, (D) defect analysis information regarding the candidate defective layers, (E) usage information regarding each of the candidate defective layers in the semiconductor device, and non-transient computer readable instructions comprising procedures for detecting a defective layer of the semiconductor device, and a processor configured to access the memory and configured to execute the instructions. The procedures comprise calculating a defect parameter value of each of the candidate defective layers by using at least one of the candidate defective layer information, the physical structure information, the defect analysis information, and the usage information, and detecting a defective layer of the semiconductor device based on a defect parameter value of each of the candidate defective layers

BRIEF DESCRIPTION OF THE DRAWINGS

Embodiments of inventive concepts will be more clearly understood from the following detailed description taken in conjunction with the accompanying drawings in which:

FIGS. 5A to 5C are diagrams for describing a method of calculating a weight, according to some example embodiments of inventive concepts;

FIG. 6 is a table showing defect parameter values according to some example embodiments of inventive concepts;

FIG. 8 is a table showing defect parameter values according to some example embodiments of inventive concepts;

DETAILED DESCRIPTION OF SOME
EXAMPLE EMBODIMENTS

Figure 1:
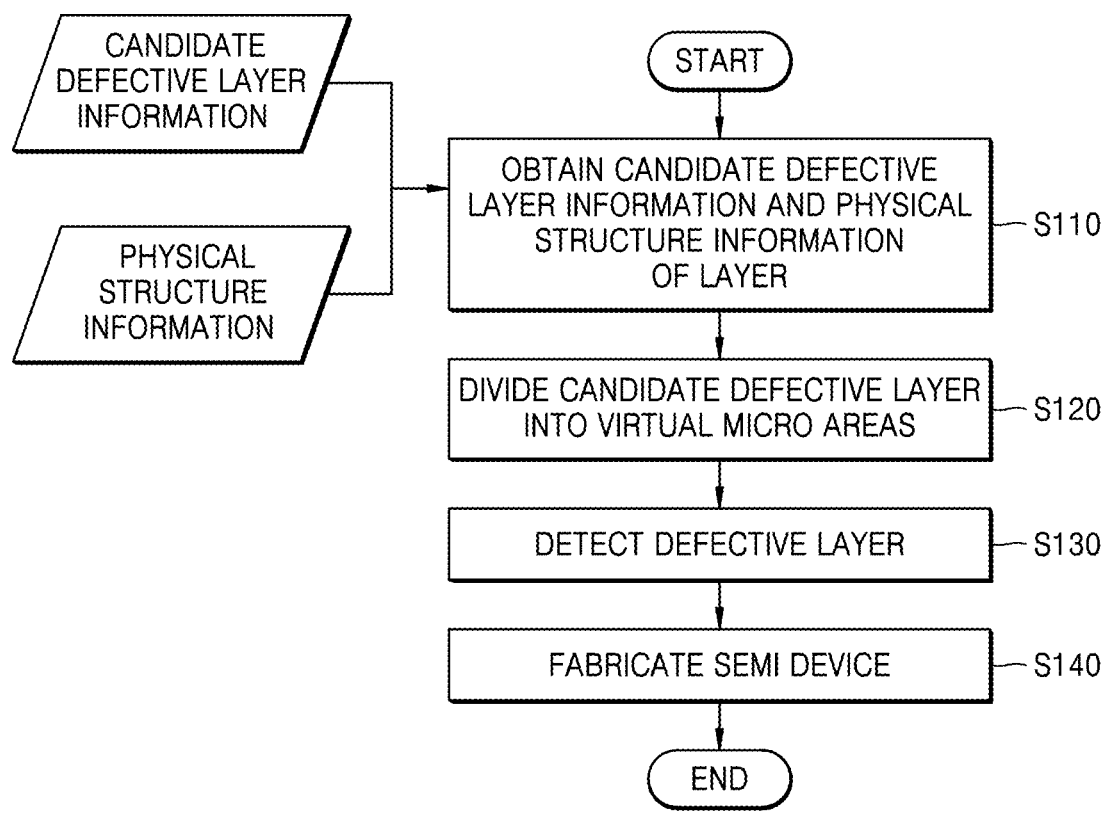
FIG. 1 is a flowchart of a method of operating a computing system, according to some example embodiments of inventive concepts.

FIG. 1 is a flowchart of a method of operating a computing system, according to some example embodiments of inventive concepts. FIG. 1 is a flowchart for describing a method, performed by a computing system, of detecting a defective layer of a semiconductor device including a plurality of layers.

Referring to FIG. 1, an operation of obtaining candidate defective layer information for a defect, such as a particle or foreign material and/or an open metal line and/or a shorted metal line, and physical structure information of a plurality of layers included in a semiconductor device may be performed (operation S110). The candidate defective layer information may include a type and/or a location of a candidate defective layer from among a plurality of layers formed in a semiconductor device, and the physical structure information may include structural information like widths, lengths, critical dimensions (CDs), pitches, spacings, fill areas, and thicknesses of the layers.

In one semiconductor device, the candidate defective layer information may vary according to the types of defects. As used herein, a method of detecting a defective layer for one type of defect is described. However, inventive concepts are not limited thereto, and a method of detecting a defective layer for various types of defects may be performed. As used herein, a defective layer may refer to a vulnerable layer that may cause a low yield in a semiconductor device, e.g., a wafer comprising a plurality of die.

To obtain candidate defective layer information, various types of failure diagnosis tools may be used. In some example embodiments, a design for test (DFT) failure diagnosis tool may be used to obtain candidate defective layer information. When a failure diagnosis tool is mounted on a semiconductor device, e.g., pm a semiconductor chip corresponding to a die on a wafer, a fail log may be collected by testing the semiconductor chip. Candidate defective layer information may be obtained by performing a simulation of the collected fail log by using a defect model.

Figure 3A:
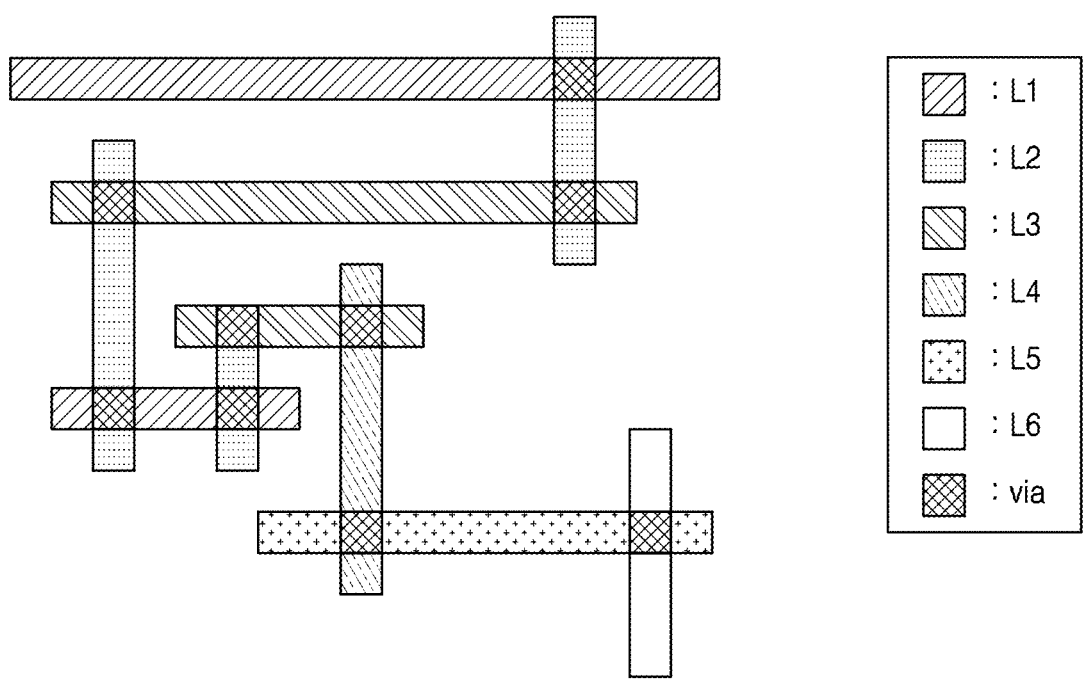
FIGS. 3A and 3B are diagrams showing candidate defective layer information according to some example embodiments of inventive concepts.

In some example embodiments, a tool that performs layout aware analysis may be used to obtain candidate defective layer information. As a result of the layout aware analysis, a combination of a plurality of layers predicted as defective layers may be predicted. For example, as shown in FIG. 3A, a net (e.g. a netlist) including candidate defective layers along with a plurality of vias may be output. For example, FIG. 3A may illustrate a net that may be prone to, or susceptible to, defects that may be critical to functionality and/or yield of a semiconductor device.

In the net output as a result of the layout aware analysis, one layer may include a plurality of wires formed in different patterns, e.g. with different polygons. For example, in FIG. 3A, a first layer L1 and a second layer L2 may be predicted as candidate defective layers. As illustrated in FIG. 3A, the first layer L1 may include 2 wires in the net (e.g. 2 wires extending in a first direction) and the second layer L2 may include 3 wires in the net (e.g. 3 wires extending in a second direction). A third layer L3 may include 2 wires in the net extending in the first direction, a fourth layer L3 may include 1 wire extending in the second direction, a fifth layer L5 may include 1 wire extending in the first direction, and a sixth layer L6 may include 1 wire extending in the second direction. Although six layers are illustrated in FIG. 3A, example embodiments are not limited thereto, and there may be more than, or less than, six layers. Furthermore although 10 wires are illustrated in FIG. 3A, example embodiments are not limited thereto, and there may be more than, or less than, 10 wires included in a net Based on the candidate defective layer information and the physical structure information, an operation of dividing a candidate defective layer into virtual micro areas may be performed (operation S120).

Layers of the same type, e.g. of the same or similar design, may exhibit different physical structures of wires (e.g., a width and/or a length of a wire) according to routing patterns and/or design rules for each process. According to inventive concepts, detection accuracy for defective layers may be improved by reflecting/taking into account the physical structure of wires to candidate defective layer information obtained as a result of a layout aware analysis.

Figure 4A:
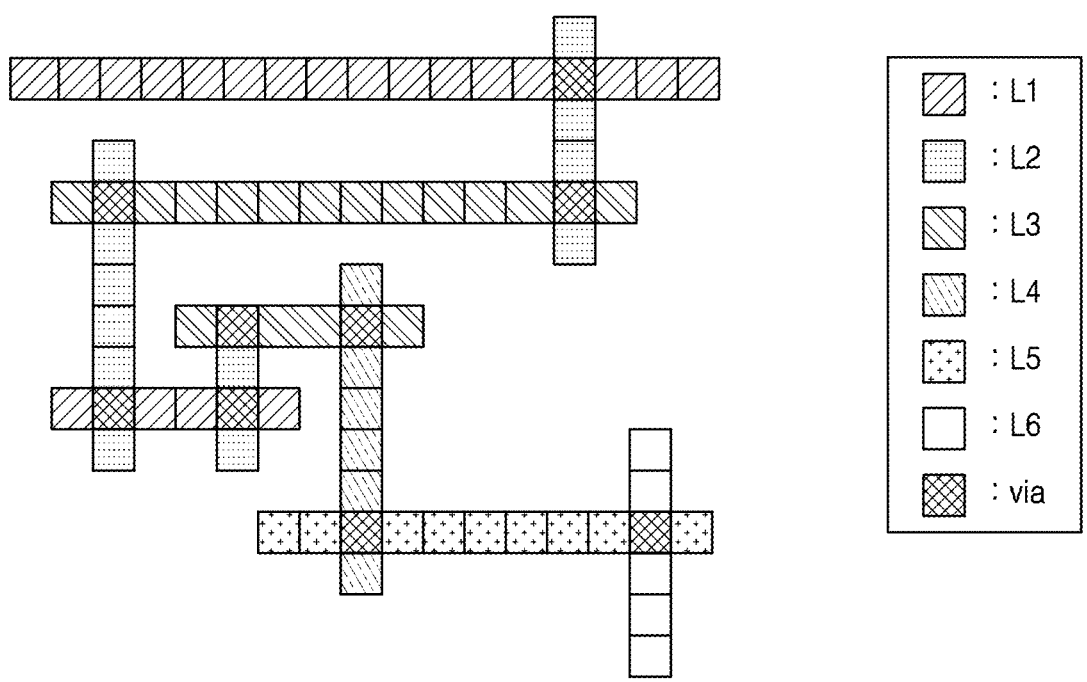
FIGS. 4A to 4C are diagrams for describing a method of correcting candidate defective layer information according to some example embodiments of inventive concepts.
Figure 4B:
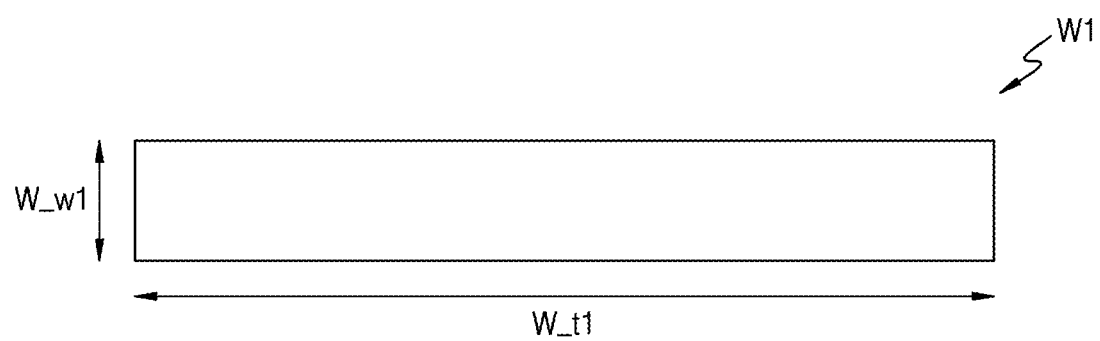
Figure 4B:
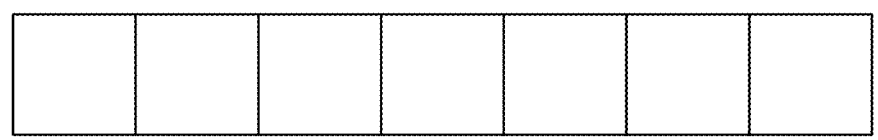
Figure 4B:
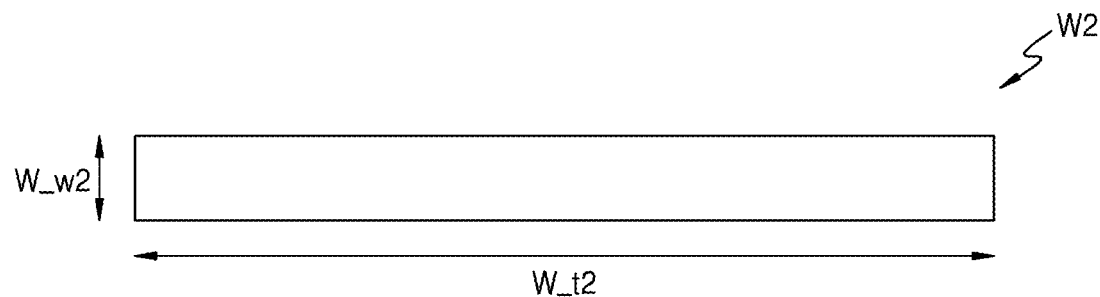
Figure 4B:
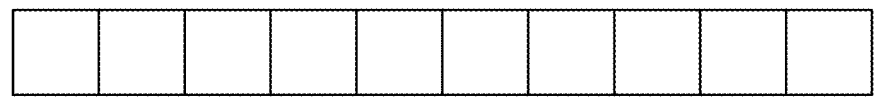

For example, each wire/each polygon may be divided into virtual micro areas as shown in FIG. 4B. Therefore, the number of wires per layer of a particular net may be converted into the number of micro areas per layer. Detailed descriptions thereof will be given below with reference to FIGS. 4A to 4C.

An operation of detecting a defective layer may be performed based on the number of micro areas of each candidate defective layer (operation S130 of FIG. 1). In some example embodiments, a candidate defective layer having the largest number of micro areas from among candidate defective layers obtained in operation S110 may be detected/identified as a defective layer. Meanwhile, a result of detecting a defective layer may be reflected in a fabrication process of an integrated circuit (IC). The method of detecting a defective layer according to the above-described embodiment may be performed in a probing/electrical die sorting (EDS) process operation, and information regarding a detected defective layer may be transferred to a process system of a semiconductor device. The process system may perform various operations to increase the yield of a semiconductor device based on defective layer information. For example, to reduce the occurrence of defective layers, previously performed processes may be modified e.g. by modifying process conditions and/or process recipes, and a defect analysis including a destruction analysis may be performed to check characteristics of detected defective layers. A semiconductor device may be fabricated based on the detected defective layer (S140). For example, the process conditions associated with the detected defective layer may be improved to fabricate the semiconductor device.

Figure 2:
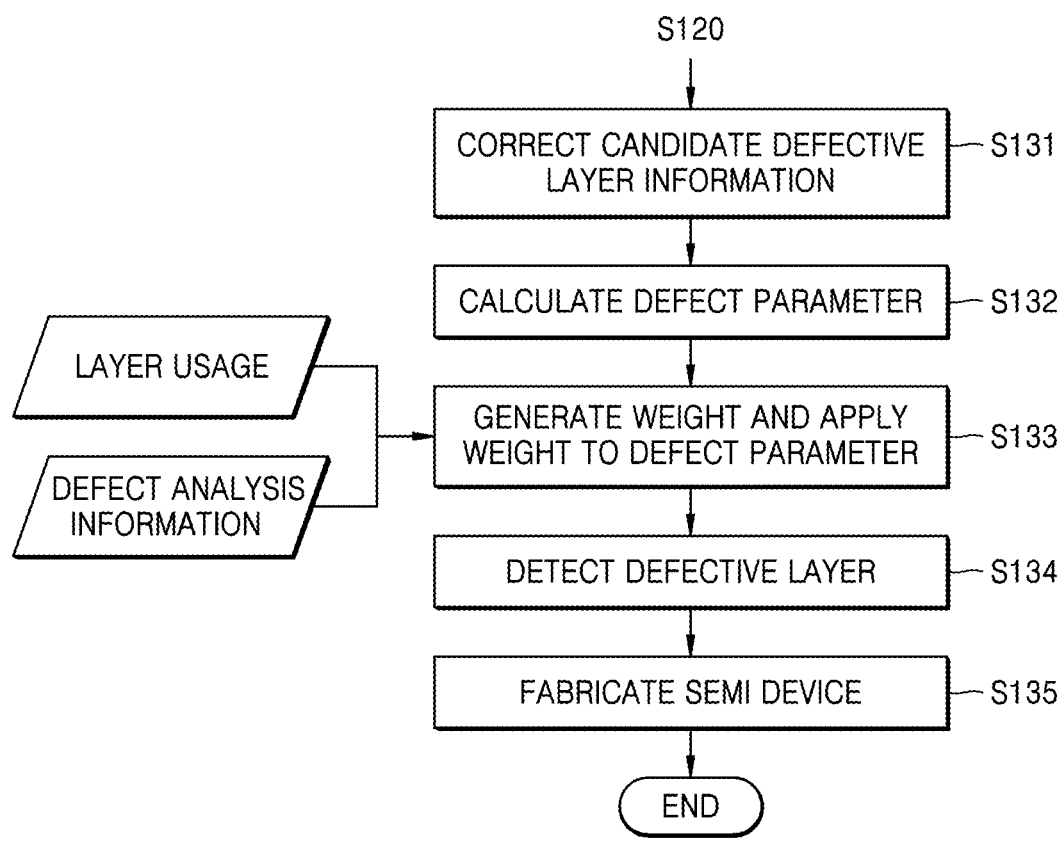
FIG. 2 is a flowchart of a method of operating a computing system, according to some example embodiments of inventive concepts.

FIG. 2 is a flowchart of a method of operating a computing system, according to some example embodiments of inventive concepts. In some example embodiments, operation S130 of FIG. 1 may include each of or some of operations S131 to S135 of FIG. 2.

Referring to FIG. 2, an operation of correcting candidate defective layer information by converting a candidate defective layer into virtual micro areas may be performed (operation S131). For example, candidate defective layer information may include a count of the number of wires constituting each candidate defective layer. Candidate defective layer information corrected by dividing each wire into virtual micro areas may include a count of the number of micro areas constituting each candidate defective layer.

An operation of calculating a defect parameter of each candidate defective layer may be performed (operation S132). A defect parameter is or corresponds to a numerical value representing the defect probability of each candidate defective layer, and may be calculated for each candidate defective layer.

An operation of generating a weight based on layer usages and defect analysis information in a semiconductor device and reflecting the generated weight to a defect parameter may be performed (operation S133). As used herein, because a wire is divided into micro areas, a layer including a large number of micro areas may be detected/identified as a defective layer. For example, a layer exhibiting a long routing length or wide wires may be detected as a defective layer. A semiconductor device may be fabricated based on the detected defective layer (S135). For example, the process conditions associated with the detected defective layer may be improved to fabricate the semiconductor device.

However, when the usage or the amount of nets associated with a layer in the semiconductor device is small, the layer detected as a defective layer in a layout aware analysis is likely be a defective layer, and thus, a weight for reflecting or for associating the usage in a semiconductor device may be used. By using a weight, it may be possible to consider how much a candidate defective layer is used within a semiconductor device, e.g., a single semiconductor chip or a wafer.

Alternatively or additionally, the weight may reflect or be indicative of or be associated with defect analysis information according to a previously performed defect analysis result. Defect analysis information may include structural characteristics and/or vulnerability information of a layer or of a wire according to a process of a semiconductor device, determined as a result of a physical destruction analysis and/or a layout analysis, for example. Defect analysis information may include characteristics of vias included in each wire. The physical destruction may include, for example, physical failure analysis including delayering and examining the semiconductor device in a microscope such as in a scanning electron microscope (SEM) and/or a transmission electron microscope (TEM). The characteristics of the via will be described in more detail with reference to FIGS. 5A to 5C.

An operation of detecting a defective layer may be performed based on a defect parameter value in which a weight is reflected (operation S134).

In some example embodiments, a candidate defective layer having the largest defect parameter value within one semiconductor chip may be determined as a defective layer. As some example embodiments, candidate defective layers may be predicted through a failure diagnosis tool in a plurality of semiconductor die/semiconductor chips, and a defective layer may be detected in each wafer based on defect parameter values of the candidate defective layers of each die/each chip.

According to the above-described embodiment of inventive concepts, by using various information like at least one of a physical structure of a wire, a layer usage, and defect analysis information based on a net of candidate defective layers, a defective layer may be detected accurately without, or with reduced or minimal, performing physical defect analysis. As the accuracy of a defective layer detection operation is improved, a process system facilitating correction of a process operation of forming a detected defective layer and exhibiting improved yield may be provided.

Figure 3B:

FIGS. 3A and 3B are diagrams for showing candidate defective layer information according to some example embodiments of inventive concepts and are diagrams for describing operation S110 of FIG. 1.

Referring to FIG. 3A, by performing layout aware analysis on one chip, a net of a plurality of candidate defective layers may be obtained within the one chip. The net may include wires formed in first to sixth layers L1 to L6 and vias formed between different layers and may further include routings, metal wires, interconnects, and vias in a layout. As illustrated in FIG. 3A, only a portion of each of the layers L1 to L6 that corresponds to one net is illustrated/

Referring to FIG. 3B, candidate defective layer information I1 may be generated based on a result of a layout aware analysis. The candidate defective layer information I1 may include the type or level of a layer predicted as a defective layer through a fault diagnosis tool and the number of wires of the corresponding layer. For example, in FIG. 3A, there are a total of six candidate defective layers in the net of interest, and the candidate defective layers may be the first to sixth layers L1 to L6. As shown in FIG. 3B, a first layer L1 may include two wires, a second layer L2 may include three wires, a third layer L3 may include two wires, a fourth layer L4 may include one wire, a fifth layer L5 may include one wire, and a sixth layer L6 may include one wire.

Figure 4C:

FIGS. 4A to 4C are diagrams for describing a method of correcting candidate defective layer information according to some example embodiments of inventive concepts.

Referring to FIG. 4A, each wire of a candidate defective layer may be divided into a plurality of virtual micro areas. Dividing a wire into virtual micro areas may be or may include dividing a wire on a screen image displayed as a result of a failure diagnosis for calculation of a defect parameter value.

Therefore, each wire may include at least one or more micro areas. For example, the number of micro areas included in each wire may be determined by Equation 1.

$$S_L = \frac{W_T}{W_W} \qquad \text{[Equation 1]}$$

In Equation 1, $S_L$ may denote the number of micro areas included in a wire, $W_W$ may denote a width of the wire, and $W_T$ may refer to a length of the wire. For example, each wire may be divided into squares and each of the virtual micro areas may be squares; however, example embodiments are not limited thereto.

A method of dividing a wire into micro areas is not limited thereto and may vary according to various information like the type of a layer, information regarding the location of the wire, a size of vias included in the wire, design rules within a semiconductor device, routing patterns, process characteristics, etc. By dividing a wire into micro areas and summing the numbers of micro areas per layer, candidate defective layer information may be normalized.

For example, referring to FIG. 4B, the number of micro-areas included in a wire may also vary as the width of the wire varies even for layers of the same type.

For example, a first wire W1 and a second wire W2 included in the first layer L1 may have different widths W_w1 and W_w2 and different lengths W_t1 and W_t2, respectively. Therefore, the number of micro areas included in the first wire W1 may be 7 by being calculated through W_t1/W_w1, and the number of micro areas included in the second wire W2 may be 10 by being calculated through W_t2/W_w2.

Meanwhile, although FIG. 4B shows a micro area as a square, inventive concepts are not limited thereto. For example, the shape of a micro area may be a polygon like a rectangle or a triangle.

A wire may also be divided into a plurality of micro-areas having different shapes. In this case, the sizes of the micro areas may be different from one another. For example, the first wire W1 may be divided into a first micro area and a second micro area, and the size and the shape of the first micro area may be different from the size and the shape of the second micro area. In some example embodiments, the first micro area may have a square shape and the second micro area may have a rectangular shape. In some example embodiments, a plurality of micro areas having different shapes may be repeatedly arranged on a wire.

Referring to FIG. 4C, candidate defective layer information (e.g., I1 of FIG. 3B) may be corrected by dividing each wire into micro areas. For example, corrected candidate defective layer information I2 may include the number of micro areas of each candidate defective layer. The number of micro areas of each candidate defective layer may be calculated through or based on Equation 2.

$$M_L = \sum_{n=1}^{T} S_{Ln}$$ [Equation 2]

In Equation 2, $M_L$ may denote the number of micro-areas of a layer, $S_{Ln}$ may denote the number of micro-areas included in a wire, and T may denote the number of wires of a layer.

For example, in order to obtain $M_L$ for the first layer L1 of FIG. 4A, the numbers of micro areas included in two wires may be summed. At this time, because T is 2, $S_{L1}$ is 17, and $S_{L2}$ is 6, the number of micro areas $M_L$ of the first layer L1 is 19.

According to the above-described method, the corrected candidate defective layer information I2 including the number of micro areas of the first to sixth layers L1 to L6 may be generated.

According to a comparative example, when predicting a defective layer only with the result of a failure diagnosis tool (e.g., the candidate defective layer information I1), the second layer L2 having the largest number of wires (e.g., three wires) may be predicted as a defective layer. However, because the prediction in the comparative example is simply based on a sum of the numbers of wires without reflecting or taking into account the characteristics of a layout pattern, it may be difficult to accurately detect a defective layer.

Therefore, according to some example embodiments of inventive concepts, by using the corrected candidate defective layer information I2 corrected by dividing each wire into micro areas, the first layer L1 having the largest number of micro areas may be detected/identified as a defective layer. The detection reflects or takes into account the physical structure of wires, thereby improving the accuracy of detection of a defective layer.

Figure 5A:
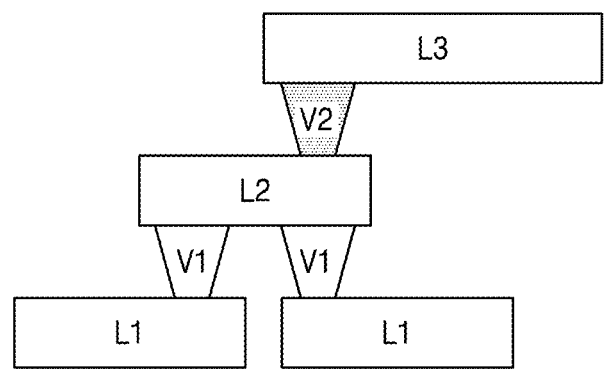
Figure 5B:
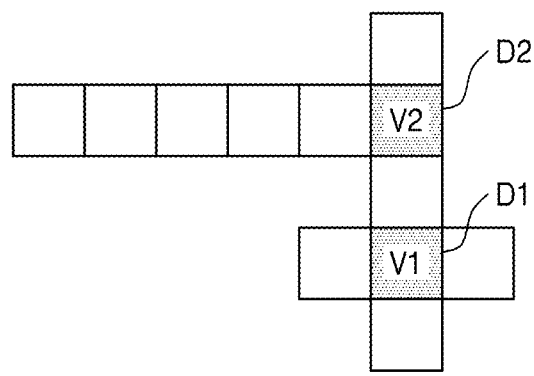

FIGS. 5A to 5C are diagrams for describing a method of calculating a weight, according to some example embodiments of inventive concepts.

To detect a defective layer, corrected candidate defective layer information (e.g., I2 of FIG. 4C) may be used, and various other information may be additionally used. For example, weight information I3 reflecting or taking into account a usage of a layer included in a semiconductor device, information regarding previously performed defect analysis such as failure analysis, and characteristics of the layer according to a process may be generated. A defective layer detection operation may be performed by calculating a defect parameter value for each layer by reflecting the weight information I3 to the corrected defective candidate layer information I2.

For example, referring to FIG. 5A, weights WL1 to WL6 of respective candidate defective layers may be generated based on information regarding defective micro areas and/or information regarding defective vias in the candidate defective layers. Defective micro area information may include at least one of the type, the locations, and the number of defective micro areas from among a plurality of micro areas included in a candidate defective layer, and/or information regarding a layer including the defective micro areas, etc. Defective micro areas from among a plurality of micro areas included in a candidate defective layer may be detected by using various methods. Defective via information may include at least one of the types, locations, and the number of defective vias, information regarding a layer including the defective vias, etc. Defective micro area information and/or defective via information may be obtained by using various methods.

For example, when a second via V2 is a defective via, weights of the second layer L2 and the third layer L3 connected to the second via V2 may have different values from a weight of the first layer L1, e.g. weights may be increased.

Referring to FIG. 5B, when a wire is divided into a plurality of micro areas, corresponding weights may be applied to the respective micro areas. For example, based on defective via information indicating that a first via V1 is normal and a second via V2 is defective, a weight may be applied to a micro area D1 in contact with the first via V1. The weight of the micro area D1 in contact with the first via V1 may be greater than a weight of a micro area D2 in contact with the second via V2. Accordingly, weights may be reflected to, or may be associated with, a wire, which includes vias, and a layer (e.g. one or more of an upper layer and a lower layer).

Referring to FIG. 5C, weight information I3 of each candidate defective layer may be generated based on a usage or a count of the corresponding candidate defective layer in a semiconductor device.

A usage of a layer used in a chip may be calculated by summing layers formed in cells, and layers used for metal routing for connection between different cells. Layer usage information may be displayed in micro areas. An amount of usage of each candidate defective layer may be calculated through Equation 3.

$$U_L = \Sigma M_{LR} + \Sigma C \times M_{LC}$$ [Equation 3]

In Equation 3, $U_L$ may denote an amount of usage of a layer, $M_{LR}$ may denote an amount of usage of a layer in metal routing, C may denote the number of cells in a chip, and $M_{LC}$ may denote an amount of usage of a layer in a cell. Each value may be expressed in micro areas.

According to Equation 3, as applied to the example embodiments in FIGS. 3A-5C, usage information $U_{L1}$ to $U_{L6}$ of the first to sixth layers L1 to L6 may be calculated.

Meanwhile, defect analysis information $PFA_{L1}$ to $PFA_{L6}$ of the first to sixth layers L1 to L6 may be information generated through defect analysis previously performed for the first to sixth layers L1 to L6. The defect analysis information $PFA_{L1}$ to $PFA_{L6}$ may include information regarding the vulnerability of each layer according to some physical properties such as a fracture strength and/or process characteristics of each layer.

Based on the usage information $U_{L1}$ to $U_{L6}$ and the defect analysis information $PFA_{L1}$ to $PFA_{L6}$ of the first to sixth layers L1 to L6, which are the candidate defective layers, the respective weights $W_{L1}$ to $W_{L6}$ of the first to sixth layers L1 to L6 may be calculated, and thus, the weight information I3 may be generated. The weight information I3 may vary according to the usage of each candidate defective layer. For example, the weight information I3 may be inversely proportional to the usage of each candidate defective layer. Alternatively, the weight of a candidate defective layer may be a large value if the candidate defective layer is determined as a vulnerable layer as a result of a defect analysis. Alternatively or additionally, the weight of each defective candidate layer may vary depending on the type of defects.

Meanwhile, although FIG. 5C shows layer usages and defect analysis information for candidate defective layers, usages and defect analysis information for layers other than candidate defective layer may also be used for a defective layer detection operation.

Figure 6:
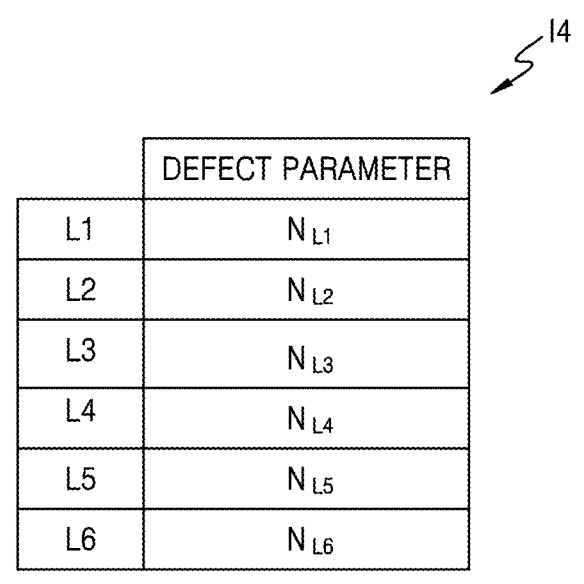

FIG. 6 is a table showing defect parameter values according to some example embodiments of inventive concepts.

To represent a defect probability, or a probability of failure, of a candidate defective layer, a defect parameter may be used. The larger the defect parameter is, the greater the probability of being detected as a defective layer. However, the inventive is not limited thereto.

Referring to FIG. 6, based on corrected candidate defective layer information (e.g., I2 of FIG. 4C) and/or weight information (e.g., I3 of FIG. 5C), defect parameter information I4 of each candidate defective layer may be generated. For example, defect parameter values $N_{L1}$ to $N_{L6}$ of the first to sixth layers L1 to L6 may be calculated through or based on Equation 4, respectively.

$$N_L = \frac{M_L}{U_L} \times W_L \qquad \text{[Equation 4]}$$

In Equation 4, $N_L$ may denote a defect parameter value of a candidate defective layer, $M_L$ may denote the number of micro areas included in the candidate defective layer, $U_L$ may denote a usage of the candidate defective layer, and WL may denote a weight of the candidate defective layer.

For example, a defective layer may be determined to be the candidate defective layer having the largest defect parameter value from among candidate defective layers. However, there is not necessarily only one defective layer, and a plurality of defective layers may be detected according to a result of comparing a defect parameter value with a pre-set reference value.

Figure 7:
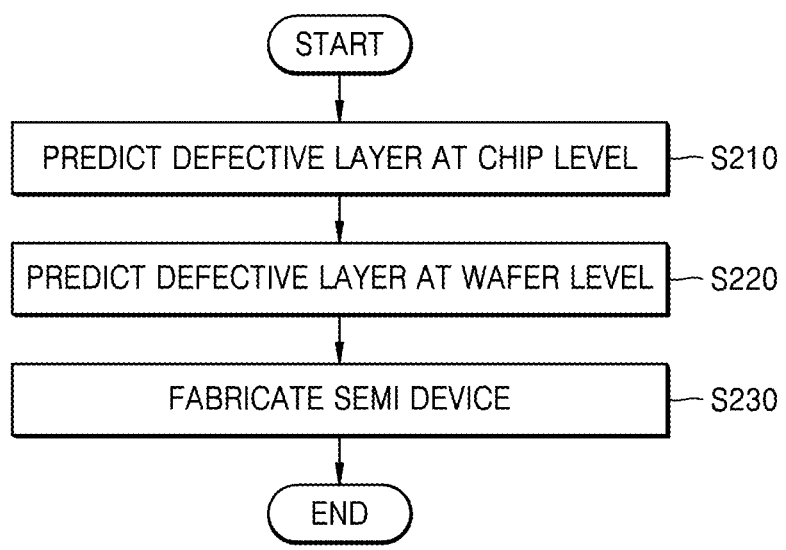
FIG. 7 is a flowchart of a method of operating a computing system, according to some example embodiments of inventive concepts.

FIG. 7 is a flowchart of a method of operating a computing system, according to some example embodiments of inventive concepts. FIG. 8 is a table showing defect parameter values according to some example embodiments of inventive concepts, and FIG. 9 is a graph showing the number/probability of defects according to layers according to some example embodiments of inventive concepts.

Figure 9:
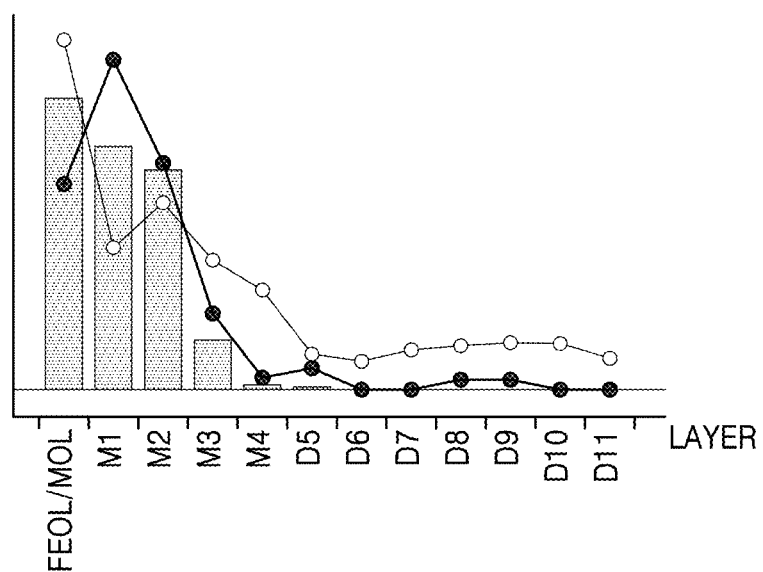
FIG. 9 is a graph showing the number/probability of defects according to layers according to some example embodiments of inventive concepts.
Figure 9:
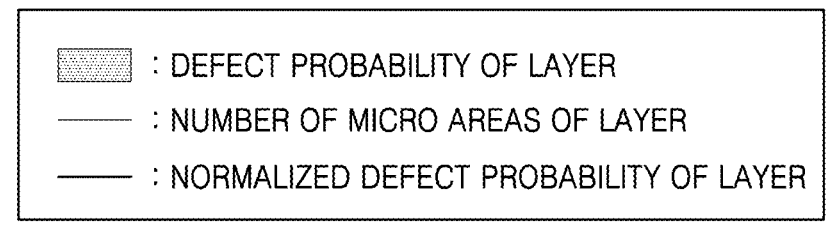

Referring to FIGS. 7 to 9 together, a semiconductor device may be formed on a wafer, and the wafer may include a plurality of chips.

An operation of detecting a defective layer at the chip level (or die level) may be performed (operation S210). For example, by performing operations S110 to S130 of FIG. 1 in each of the chips, a defective layer may be detected in each of the chips.

As a result of operation S210, defect parameter values of candidate defective layers are calculated in each chip/in each die, and defect parameter information I5 as shown in FIG. 8 may be generated. The defect parameter information I5 may include defect parameter values $N_{11}$ to $N_{63}$ of the first to sixth layers L1 to L6 included in a first chip C1.

Although it is assumed in FIG. 8 that each chip includes the same candidate defective layers (e.g., the first to sixth layers L1 to L6), inventive concepts are not limited thereto, and candidate defective layers may be determined differently in each chip.

Based on defect parameter values of each candidate defective layer, a defective layer with the highest defect probability may be determined in each chip. For example, a candidate defective layer having the largest defect parameter value may be detected/identified as a defective layer in each chip.

Based on the defect parameter information, an operation of detecting a defective layer at the wafer level may be performed (operation S220). A semiconductor device may be fabricated based on the detected defective layer (S230). For example, the process conditions associated with the detected defective layer may be improved to fabricate the semiconductor device. A vulnerable layer with a high defect probability may be detected in a wafer, and, for example, a usage of each layer in the wafer may be considered as shown in Equation 5.

$$D_L = \frac{\sum_{n=1}^{T_C} C_{Ln}}{U_L} \qquad \text{[Equation 5]}$$

In Equation 5, $D_L$ denotes a value obtained by normalizing a defect probability for each layer, $T_C$ denotes the number of chips included in a wafer, and $C_{Ln}$ denotes a parameter indicating whether a layer is detected as a defective layer in an n-th chip and may have a value of 0 or 1. The sum of $C_{Ln}$ values for all chips/all die may be referred to as a defect probability of a layer. $U_L$ denotes a layer usage and may be in units of micro areas.

According to some example embodiments, normalized defect probabilities of candidate defective layers are calculated, and a defective layer, or a layer more prone to/sensitive to critical defects, may be detected and identified at the wafer level based on the normalized defect probabilities. A semiconductor fabrication process may be performed based on detected defective layer information. As a result, a defective layer may be detected only through a statistical analysis without, or with minimally, performing physical failure analysis (PFA) of a defective layer. Alternatively or additionally, a process may be improved by collecting statistical information regarding defective layers and predicting and detecting the occurrence of a defective layer in advance based on accumulated statistical information. Therefore, not only the accuracy of a semiconductor manufacturing process may be improved, but also cost and time needed for improving the semiconductor manufacturing process may be reduced.

In Equation 5, it is assumed that one defective layer is detected in each chip, but inventive concepts are not limited thereto.

Referring to FIG. 9, a wafer may include at least one of a front-end-of-the-line (FEOL) structure, a middle-of-the-line (MOL) structure, and a back-end-of-the-line (BEOL) structure. The FEOL structure may refer to layers formed through a FEOL process, the MOL structure may refer to layers formed through an MOL process, and the BEOL structure may refer to layers formed through a BEOL process.

For example, a wafer may include an FEOL/MOL layer such as active areas, gate lines, and/or contacts such as gate contacts and/or source/drain contacts, a plurality of metal layers M1 to M4 having the same or different widths and/or the same or different pitches, a plurality of via layers between upper and lower metal layers, and interlayer insulation layers D5 to D11 for insulating the metal layers M1 to M4, and may further include other layers.

For each layer included in the wafer, a normalized defect parameter value may be determined according to some example embodiments, and normalized defect parameter values may be expressed as a graph. The graph may include at least one of a defect probability of each layer, a count of the number of micro areas included in each layer, and a normalized defect probability in each layer.

For example, a bar graph may indicate a defect probability of each layer, a gray line graph may indicate the number of micro areas included in each layer, and a red line graph may indicate a normalized defect probability in each layer.

At least one defective layer may be determined in a wafer by comparing normalized defect probabilities in each layer. When detecting a defective layer of a semiconductor device based only on a bar graph, an FEOL/MOL layer may be detected as a defective layer. However, when a layer usage is considered, a first metal layer M1 may be detected as a defective layer.

Therefore, a method of detecting a defective layer according to some example embodiments may accurately detect a defective layer considering at least one of physical structures of layers and/or wires, usages of the layers in a semiconductor device, and defect analysis information together with a failure diagnosis result.

Figure 10:
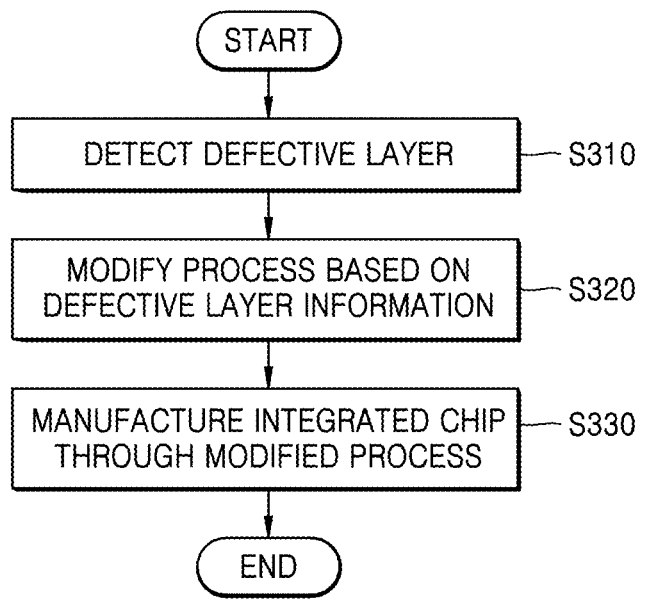
FIG. 10 is a flowchart of a method of manufacturing an integrated circuit, according to some example embodiments of inventive concepts.

FIG. 10 is a flowchart of a method of manufacturing/fabricating an IC, according to some example embodiments of inventive concepts.

A method of manufacturing a semiconductor device may be divided between an IC design process and an IC fabrication process. The method of fabricating a semiconductor device according to some example embodiments may be performed by detecting a defective layer according to the method described above with reference to FIGS. 1 to 9 and based on defective layer information.

Referring to FIG. 10, a defective layer detection operation may be performed (operation S310). For example, a defective layer included in an IC may be detected according to the method described above with reference to FIGS. 1 to 9. The defective layer detection operation may be performed in an EDS operation.

A process may be modified based on defective layer information (operation S320). A related process may be modified based on the defective layer information including a type and a location of a defected layer and a type of a defect. For example, a related process may be modified depending on the type of a defect like at least one of a scratch, a slip line, a stacking defect, a gate wiring defect, a foreign material, a resist toppling defect, a scum defect, a blocked contact and/or a blocked via, and/or a non-etching defect. The defects may cause unwanted shorts, unwanted opens, and/or undesirable reliability concerns.

An IC may be fabricated through a modified process (operation S330). An IC fabrication operation may include generating layout data, fabricating a mask based on the layout data, and manufacturing an IC by patterning a plurality of layers using a fabricated mask.

The IC manufacturing operation may include a front-end-of-line (FEOL) process, a middle-of-line (MOL) process, and a back-end-of-line (BEOL) process.

The FEOL process may refer to a process of forming individual devices like transistors, capacitors, and/or resistors on a substrate during a process of manufacturing an IC. For example, the FEOL process may include planarizing and cleaning a wafer, forming a trench, forming a well, forming a gate line, and forming a source and a drain, etc.

The BEOL process may refer to a process of interconnecting individual devices like transistors, capacitors, and resistors during a process of manufacturing an IC. For example, the BEOL process may include silicidation of gate, source, and drain regions, adding a dielectric, planarizing, forming a hole, adding a metal layer, forming a via, forming a passivation layer, etc. Next, the IC may be packaged in a semiconductor package and used as a component for various applications.

Because a method of detecting a defective layer according to some example embodiments of inventive concepts is applied to a semiconductor process, a process operation that caused a defective layer may be more immediately corrected or improved, thereby increasing the speed of improving the semiconductor process.

Figure 11:
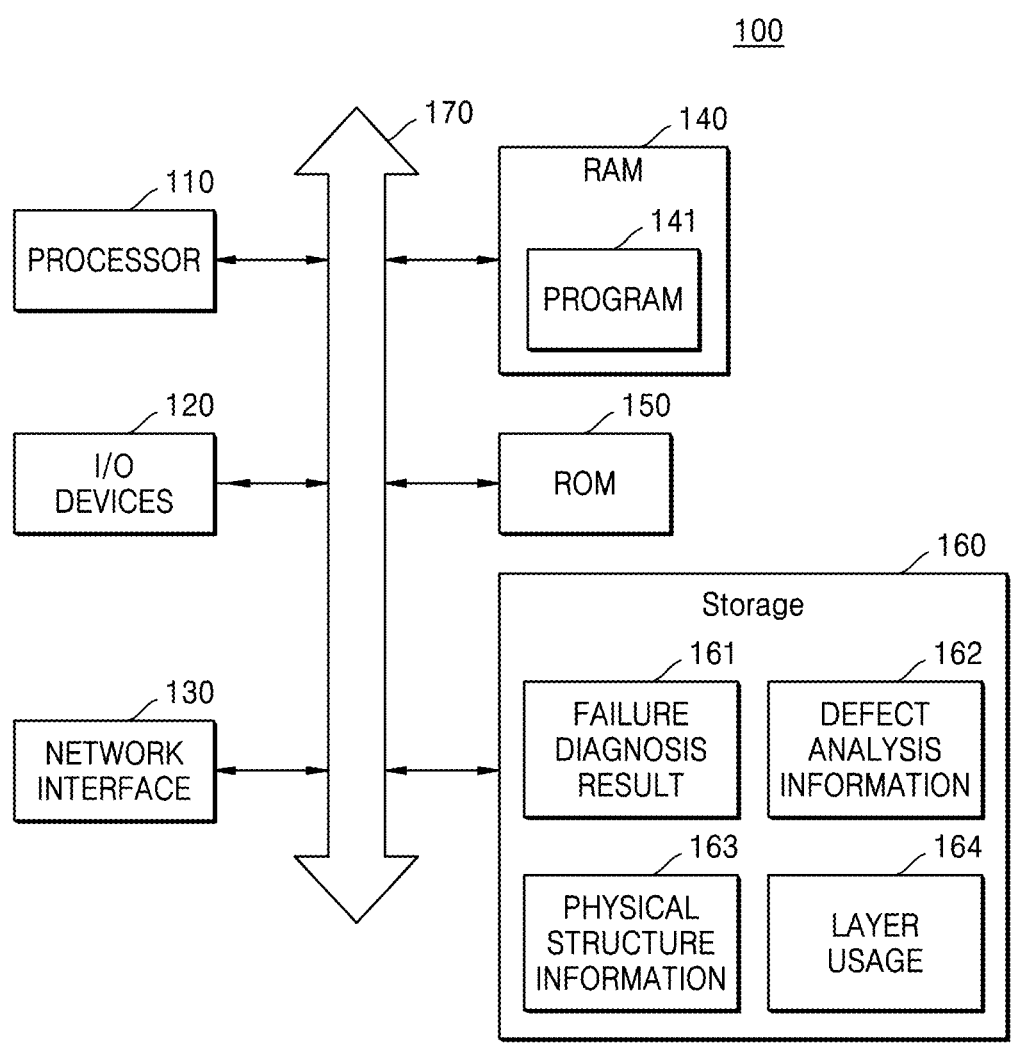
FIG. 11 is a block diagram showing a computing system including a memory storing a program according to some example embodiments of inventive concepts.

FIG. 11 is a block diagram showing a computing system including a memory storing a program according to some example embodiments of inventive concepts.

Referring to FIG. 11, at least some of operations for detecting a defective layer of a semiconductor device according to some example embodiments of inventive concepts (e.g., S110 to S130 of FIG. 1, S131 to S134 of FIG. 2, and S210 to S210 of FIG. 7) may be performed in a computing system 100. In some example embodiments, a computing system may be referred to as a system for calculating defect parameters.

The computing system 100 may be a stationary computing system like at least one of a desktop computer, a workstation, or a server or a portable computing system like a laptop computer. As shown in FIG. 11, the computing system 100 may include a processor 110, input/output devices 120, a network interface 130, random access memory (RAM) 140, and read-only memory (ROM) 150, and a storage device 160. The processor 110, the input/output devices 120, the network interface 130, the RAM 140, the ROM 150, and the storage device 160 may be connected to a bus 170 and may communicate with one another through the bus 170.

The processor 110 may be referred to as a processing unit and, for example, may include at least one core, e.g., a micro-processor, an application processor (AP), a digital signal processor (DSP), a graphics processing unit (GPU), etc., capable of executing an arbitrary instruction set (e.g., Intel Architecture-32 (IA-32), 64-bit extended IA-32, x86-64, PowerPC, Sparc, MIPS, ARM, IA-64, etc.). For example, the processor 110 may access a memory, that is, the RAM 140 or the ROM 150, through the bus 170 and may execute instructions stored in the RAM 140 or the ROM 150.

The RAM 140 may store a program 141 or at least a part thereof for detecting a defective layer of a semiconductor device according to some example embodiments of inventive concepts, and the program 141 may control the processor 110 to perform at least some of operations (e.g., S110 to S130 of FIG. 1, S131 to S134 of FIG. 2, and S210 to S220 of FIG. 7) to calculate defect parameters of layers and detect a defective layer.

The program 141 may include a plurality of instructions executable by the processor 110, and the instructions included in the program 141 may control the processor 110 to perform at least some of the above-stated operations.

The storage device 160 may not lose stored data even when power supplied to the computing system 100 is cut off. For example, the storage device 160 may include a non-volatile memory device or a storage medium like a magnetic tape, an optical disk, or a magnetic disk. Alternatively or additionally, the storage device 160 may be detachable from the computing system 100. The storage device 160 may store the program 141 according to some example embodiments of inventive concepts, and, before the program 141 is executed by the processor 110, the program 141 or at least a part thereof may be loaded to the RAM 140. Alternatively or additionally, the storage device 160 may store a file written in a program language, and the program 141 generated from the file by a compiler or the like or at least a part of the program 141 may be loaded to the RAM 140. Also, as shown in FIG. 11, the storage device 160 may store information needed to predict a defective layer, e.g., a failure diagnosis result 161 obtained from a failure diagnosis tool, defect analysis information 162 obtained as a result of performing a defect analysis, physical structure information 163 of layers and/or wires, and layer usage 164 in a semiconductor device. The above-described information may be obtained by an operation of the computing system 100 or may be obtained from other devices that are distinguished from the computing system 100.

The storage device 160 may store data to be processed by the processor 110 or data processed by the processor 110. For example, the processor 110 may generate data by processing data stored in the storage device 160 according to the program 141 and may store generated data in the storage device 160.

The input/output devices 120 may include an input device like a keyboard and a pointing device and may include an output device like a display device and a printer. For example, a user may trigger the execution of the program 141 by the processor 110 through the input/output devices 120 and may check failure diagnosis information including the net of candidate defective layers of FIGS. 3A and/or 4A and a graph showing the defect probability for each layer in FIG. 8.

The network interface 130 may provide access to a network outside the computing system 100. For example, a network may include a plurality of computing systems and communication links, and the communication links may include wired links, optical links, wireless links, or any other types of links.

Figure 12:
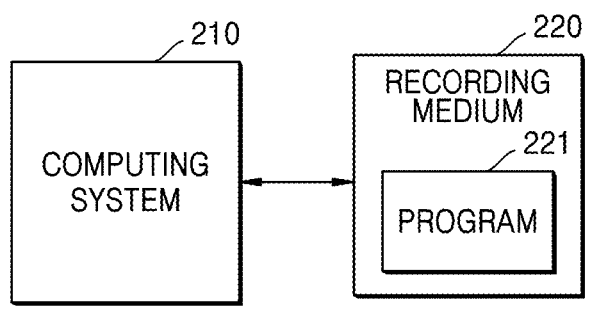
FIG. 12 is a block diagram showing a computing system accessing a storage medium storing a program according to some example embodiments of inventive concepts.

FIG. 12 is a block diagram showing a computing system accessing a storage medium storing a program according to some example embodiments of inventive concepts.

Referring to FIG. 12, at least some of operations for detecting a defective layer of a semiconductor device according to example embodiments of inventive concepts (e.g., S110 to S130 of FIG. 1, S131 to S134 of FIG. 2, and S210 to S210 of FIG. 7) may be performed in a computing system 210. The computing system 210 may access a computer-readable medium 220 and execute a program 221 stored in the computer-readable medium 220. In some example embodiments, the computing system 210 and the computer-readable medium 220 may be collectively referred to as a system for calculating a defect parameter.

The computing system 210 may include at least one computer sub-system, and the program 221 may include at least one component executed by at least one computer sub-system. For example, the at least one component may include an algorithm for calculating a defect parameter value and/or a failure diagnosis tool described above with reference to the drawings.

Similar to the storage device 160 of FIG. 11, the computer-readable medium 220 may include a non-volatile memory device or a storage medium like a magnetic tape, an optical disk, or a magnetic disk. Also, the computer-readable medium 220 may be detachable from the computing system 210.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While inventive concepts has been particularly shown and described with reference to embodiments thereof, it will be understood that various changes in form and details may be made therein without departing from the spirit and scope of the following claims.

What is claimed is:

1. A method of detecting a defective layer of a semiconductor device including a plurality of layers performed by a computing system, the method comprising:
obtaining candidate defective layer information regarding a plurality of candidate defective layers and obtaining physical structure information regarding the candidate defective layers;
dividing each of wires in the candidate defective layers into virtual micro areas based on the candidate defective layer information and based on the physical structure information; and
identifying a defective layer from among the candidate defective layers according to a number of the virtual micro areas.

2. The method of claim 1, wherein, in the detecting of the defective layer, a candidate defective layer having the largest number of micro areas from among the candidate defective layers corresponds to the identified defective layer.

3. The method of claim 1, wherein the dividing of each of the wires in the candidate defective layers into the virtual micro areas comprises generating corrected candidate defective layer information by converting the candidate defective layer information into the micro areas, and
the identifying of the defective layer comprises:
calculating a defect parameter value of each candidate defective layer by using at least one of the corrected candidate defective layer information, usage information regarding the candidate defective layers, and defect analysis information; and identifying a defective layer of the semiconductor device based on a defect parameter value of each of the candidate defective layers.

4. The method of claim 3, wherein the defect parameter value is based on a weight, the weight generated based on at least one of the usage information and the defect analysis information.

5. The method of claim 3, wherein, in the calculating of the defect parameter value, the defect parameter value is calculated such that the defect parameter value increases as the number of virtual micro areas increases as compared to a usage of each candidate defective layer in the semiconductor device included in the usage information.

6. The method of claim 3, wherein the calculating of the defect parameter value comprises:
   obtaining defective via information; and
   calculating the defect parameter value such that a large weight is associated with the defect parameter value of a candidate defective layer adjacent to a defective via based on the defective via information, the large weight larger than other weights associated in the defect parameter value of another candidate defective layer that are not adjacent to a defective via.

7. The method of claim 3, wherein the calculating of the defect parameter value comprises calculating the defect parameter value based on a weight according to a process of forming each of the candidate defective layers.

8. The method of claim 1, wherein a size of a micro area is based on a physical structure of each of the candidate defective layers.

9. The method of claim 1, wherein the physical structure information regarding the candidate defective layers comprises:
   at least one of a width of each of the wires and a length of each of the wires, the wires in each candidate defective layer, a routing pattern, and a number of vias included in each candidate defective layer.

10. A method, performed by a computing system, of identifying a defective layer of a semiconductor device including a plurality of chips, the method comprising:
   obtaining defect analysis information regarding candidate defective layers included in each of the plurality of chips by performing failure analysis on each of the plurality of chips;
   calculating a defect parameter value of each candidate defective layer for each of the plurality of chips based on at least one of physical structure information, the defect analysis information, and usage information of the candidate defective layers; and
   identifying a defective layer of the semiconductor device based on the defect parameter value of each candidate defective layer for each of the plurality of chips.

11. The method of claim 10, wherein the calculating of the defect parameter value comprises:
   dividing each of wires in the candidate defective layers into virtual micro areas based on the physical structure information of each of the candidate defective layers; and
   calculating the defect parameter value according to a number of virtual micro areas.

12. The method of claim 11, wherein, in the dividing into the virtual micro areas, each of the wires in the candidate defective layers is divided into virtual micro areas such that a number of the virtual micro areas included in the wires increase as a length of each of the wires in the candidate defective layer increases or as a width of each of the wires in the candidate defective layer decreases.

13. The method of claim 11, wherein, in the calculating of the defect parameter value, the defect parameter value is calculated to be proportional to the number of virtual micro areas of each candidate defective layer in each chip.

14. A computing system for detecting a defective layer of a semiconductor device comprising a plurality of layers, the computing system comprising:
   a memory configured to store candidate defective layer information comprising (A) types of a plurality of candidate defective layers for defects, (B) a number of the plurality of candidate defective layers for detects, (C) physical structure information regarding the candidate defective layers, (D) defect analysis information regarding the candidate defective layers, (E) usage information regarding each of the candidate defective layers in the semiconductor device, and non-transient computer readable instructions comprising procedures for detecting a defective layer of the semiconductor device; and
   a processor configured to access the memory and configured to execute the instructions,
   wherein the procedures comprise:
   calculating a defect parameter value of each of the candidate defective layers by using at least one of the candidate defective layer information, the physical structure information, the defect analysis information, and the usage information; and
   detecting a defective layer of the semiconductor device based on a defect parameter value of each of the candidate defective layers.

15. The computing system of claim 14, wherein, in the calculating of the defect parameter value, the defect parameter value is calculated by dividing each of wires in the candidate defective layer into virtual micro areas based on at least one of (A) a length each of the wires in the candidate defective layer, (B), a width of each of the wires in the candidate defective layer, (C) a routing pattern, and (D) a design rule of each candidate defective layer.

16. The computing system of claim 15, wherein, in the calculating of the defect parameter value, the defect parameter value is calculated by summing numbers of virtual micro areas included in the candidate defective layers.

17. The computing system of claim 15, wherein, in the calculating of the defect parameter value, the defect parameter value is calculated such that the defect parameter value increases as a number of virtual micro areas increases.

18. The computing system of claim 14, wherein the calculating of the defect parameter value comprises:
   obtaining at least one piece of defective via information for the defect; and
   calculating the defect parameter value based on the at least one piece of defective via information.

19. The computing system of claim 14, wherein, in the calculating of the defect parameter value, the defect parameter value is calculated such that a large weight is associated with the defect parameter value of a candidate defective layer adjacent to defective vias, the larger weight being larger than another weight associated with a defect parameter value of a candidate defective layer not adjacent to defective vias.

20. The computing system of claim 14, wherein the semiconductor device comprises a plurality of chips,
   the memory further is configured to store candidate defective layer information of each chip, and
   the processor is configured to execute the procedures for each of the chips to calculate defect parameter values of candidate defective layers of each of the chips and to detect the defective layer of the semiconductor device based on calculated defect parameter values.

\* \* \* \* \*